April 11, 1939.  G. DE BECZE  2,154,150
APPARATUS FOR CARRYING OUT PHYSICAL AND CHEMICAL REACTIONS
Original Filed July 6, 1937
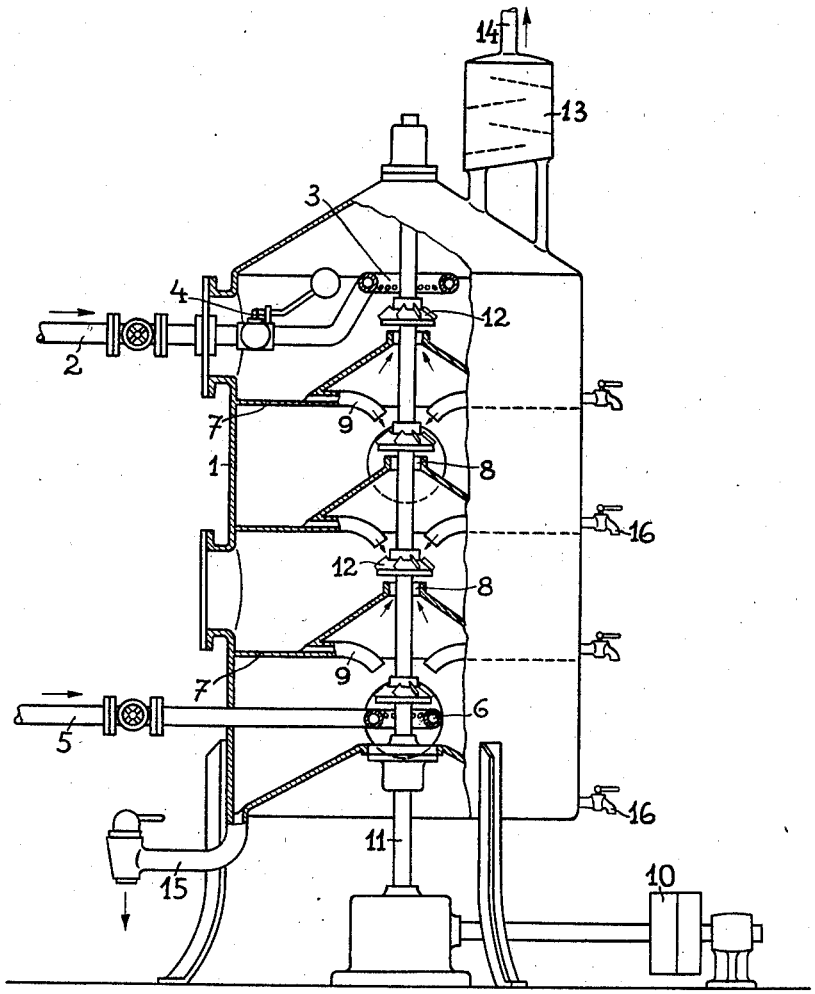
Inventor
George de Becze Patented Apr. 11, 1939

2,154,150

UNITED STATES PATENT OFFICE 2,154,150

APPARATUS FOR CARRYING OUT PHYSICAL AND CHEMICAL REACTIONS

George de Becze, Budapest, Hungary

Original application July 6, 1937, Serial No. 152,278. Divided and this application January 24, 1938, Serial No. 186,735. In Hungary January 3, 1936

1 Claim. (Cl. 261—93)

This invention relates to an apparatus for carrying out physical or chemical reactions between two or more reactants, more particularly between a liquid, a liquid mixture or a suspension on the one hand, and one or more gaseous reactants on the other.

The subject matter of the application is divided from the application Serial No. 152,278, filed July 6, 1937.

Processes in which two or more materials act upon one another either physicaly or chemically take place in customary industrial apparatus more or less incompletely. The materials in the reaction chamber are only converted partly into the desired product and partly leave the reaction chamber unaltered, either mixed with the end product or alone. If the individual particles of material of the reactant were brought into contact, the desired reaction would take place in a short time, but such movement is however in fact only possible with a portion of the different particles while the other particles during the whole time while they are in the reaction chamber are either surrounded by particles of their own material or of the product which is formed and which is no longer itself reactive.

It has been sought to increase the possibility of contact between the particles of the different reactants in the reaction of a liquid and a gas inter alia by application of the known column constructions in which the fluid in a relatively thin layer passes successively through several zones at different heights, through which the gases or vapors fed in counter current pass successively. The possibility of contact between the particles of material was in this way essentially increased, but for the attainment of suitable results a great number of such zones was necessary whereby the space requirements of the column considerably increased, and in many cases even several columns must be connected together.

For favoring the contact between the particles of material, other apparatus were also proposed, in which the reaction space was subdivided into a plurality of communicating superposed compartments, through which the fluid and the gaseous reactant passed in counter current so that each compartment comprised a gas-filled upper and a liquid-filled lower space. Each compartment was provided with a revolving vaned wheel or other fluid stirring means by which the fluid was projected or sprayed in the upper gas-filled space of the compartment. Owing to their relatively large gas-filled spaces with only relatively small quantities of fluid sprayed therein, these apparatus also required much space.

Contrary to that, in the apparatus according to the invention the individual superposed sections are filled by the liquid reactant, and the gaseous reactant is distributed therein, forming with the reactant a transiently homogeneous dispersion which fills the greater part of the section. Thus the reactants are in intimate contact with one another, which makes possible the more rapid, certain and complete carrying out of the reactions in view between a liquid, a liquid mixture or a suspension (reactant A) on the one hand, and one or more gaseous materials (reactant B) on the other hand, either to the end or only to a desired stage, the apparatus also requiring less space than previously owing to the fact that larger quantities of the reactants are in intimate contact at a given time.

The apparatus according to the invention consists of a column divided into superposed sections, each of which contains a mixing device arranged below the liquid surface, inlets for the reactants provided near the mixer, and outlets for the changed reactants or products of reaction at points remote from the mixer, and communicating with the inlets of the adjacent sections.

Through the closed reaction space formed by this column and divided into sections the two reactants A and B are fed in counter current to one another, in such a manner that the liquid reactant substantially fills the individual sections. At first, and indeed immediately upon its entry into the individual sections, the gaseous reactant, with the aid of the mixing device below the liquid surface, is distributed into the liquid so as to form an intimate mixture having the form of a dispersion of the gas in the liquid which is homogeneous for a short space of time, and fills the greater part of the section, being then and in the same section separated again. The separation takes place at any point of the section which is relatively far from the mixer and for practical purposes lies outside its range of action, and may be assisted by wall-like insertions arranged at the edge of the section or other means adapted to increase the friction of the liquid and acting to oppose the rotary movement imparted by the mixer. The separate phases produced by separations and which are respectively poorer in the constituents or components which have entered into reaction with one another in the mixed state or have become enriched in the reaction products formed thereby but which are still reactive, are fed forward as reactants $A_1$ and $B_1$ into the next section determined by the counter current and substantially filled by the liquid reactant, where the gas is again distributed into the liquid to form a transiently homogeneous dispersion filling the greater part of the section, being then separated and so on, so that when they have passed through all the sections they may be conducted away as exhausted or finished products $A_x$ or $B_x$ at the two opposite ends of the reaction space.

The number of the individual sections is settled according to the desired degree to which the reaction in view is intended to be carried out.

The entry into the individual sections of the materials flowing from adjacent sections takes place in the range of action of the stirring mechanism, i. e. in a place where the materials are in movement produced by the stirring mechanism. Thus the freshly introduced reactants A and B come into contact with one another immediately upon their entry.

The separating walls between the individual sections or the openings, tubes, deflecting plates, etc., arranged in the sections are so formed that materials passing from each two adjacent sections enter by openings in the section provided in the vicinity or within the working range of the stirring mechanism. Preferably these openings or leads are also the highest and lowest points of the two adjacent sections so that the already separated reactants A and B, or $A_1$ and $B_1$, or $A_x$ and $B_x$ can pass out through them.

In order to favor the course of the process to be carried out in the reaction space, a suitable elevated or reduced pressure can be maintained.

The accompanying drawing shows partly in vertical section an example of the apparatus according to the invention.

The reaction vessel 1 which is formed like a column is filled with a fluid reaction component A which flows downwards and which continually streams in through the openings of the ring-like part 3 of the pipe 2. The quantity of fluid fed in is adjusted by a float valve 4. Through the openings of the ring-like part 6 of the tube 5 there likewise enters continuously a gaseous reactant B. The reaction vessel 1 is divided by the partitions 7, 7, raised in the middle into a cone, into sections which communicate partly by way of the openings 8, 8, of the conical parts and partly by the tubes 9, 9. Vaned wheels 12, 12 are provided in each of the individual sections below the liquid surface and are fixed on the shaft 11 which is maintained in rotation by the drive 10 and which passes through all the sections.

The gas which enters through the openings of the ring-like tubular part 6 into the fluid and which rises therein is distributed in the fluid by the action of the rotating vaned wheel 12 to a homogeneous dispersion filling the greater part of the section, the gaseous residues not combined with the fluid and which separate collect in the conical part of the partition 7 above the vaned wheel, and pass through the openings 8 directly to the vaned wheel 12 of the next section, where they are distributed again in the surrounding liquid to form a homogeneous dispersion under the action of said vaned wheel. The unmixed or separated part of the gas collects again in the conical part of the upper partition of the section and the process is repeated. The gases which now only contain neutral constituents, or which have been completely neutralised, or which constitute an excess over the quantity corresponding to the desired degree of conversion and which pass out unchanged, are freed from any entrained fluid in the fluid separator 13 and are liberated through tube 14.

During the rising of the gas in the reaction vessel 1 the liquid entering through the openings of the tube ring 3 is mixed by the vaned wheel 12 situated below the liquid surface with the gases which enter through the openings 8 of the conical partition 7. The fluid which has separated again passes through the tubes 9, 9 into the next section and directly to the vaned wheel 12 which mixes it with the gases entering the section from below. The liquid separated from the gases streams through the tubes 9, 9, to the vaned wheel 12 of the next section and the process is repeated.

The fluid which is now neutral or at least only contains the desired quantity of active material can be removed through the tube 15.

The degree to which the reaction is carried out may be controlled by sampling taps 16, 16, provided in the individual sections.

As is apparent, each section in consequence of the conical raising of the partition 7 projects into the section overlying it whereby the individual sections are given an increased height, and in this way for the separation of the materials a space is available which is higher than the distance apart of the sections, without increasing the space requirements of the sections. Since the contact of fluid and gas takes place to the necessary extent under the action of the stirring mechanism by which the gas is distributed in the fluid to form a homogeneous dispersion, the continual maintenance of a large fluid surface in contact with the gas is not necessary, the size of the gas spaces may be reduced to the minimum in the conical parts of the sections and the space required is considerably diminished. In order to slow down the rotary movement imparted to the dispersion by the vaned wheel 12 or to favor the rapid separation of the reaction constituents A and B, in the inner wall of the reaction vessel radially arranged plates or the like may be formed.

After passing through each section, one or both of the two reactants A and B undergoes a change of composition, since in consequence of the reaction which has taken place during admixture one reactant may become poorer in certain components or portions while the other reactant is enriched in the reaction product so that into the next section somewhat altered reactants $A_1$ and $B_1$ or $A_2$ and $B_2$, etc., pass.

The apparatus according to the invention is also suited for the manufacture of solid products, for example chalk. In this case into the reaction vessel 1 through the tube 2 and the openings of the tube ring 3, milk of lime is continually introduced as reactant A (fluid phase) which passes downwards through the individual sections of the series, substantially filling them. At the same time through the tube 5 and the openings of the ring-like tube part 6 likewise continually carbon dioxide or gas mixtures containing the same, e. g., furnace gases, are fed as reactant B and pass upwards through the sections. The gases entering the individual sections from below through the openings 8 and the downwardly flowing milk of lime passing through the tubes 9 are mixed by the vaned wheel 12 to form a transiently homogeneous dispersion, while the product of reaction—pulverulent chalk in the form of an aqueous suspension—collects in the lower part of each section and the neutral gases remaining collect in the upper part whence they pass into the next section. The fine chalk dust produced which when using pure milk of lime is of outstanding quality can be removed from the bottom section by the tube 15 and then be separated from the fluid by sedimentation in the usual way.

When proceeding in a similar manner as just described, but with the use, as a liquid reactant, of an aqueous suspension of magnesia (MgO) or more advantageously an aqueous suspension of the hydrated product of magnesia, i. e., magnesia hydroxide: $Mg/OH/_2$, various carbonate compounds of the magnesia may be obtained.

Instead of the vaned wheels other suitable devices of the same action might be used like scoops, propellers, etc., and the drive may take place in a different manner from that described by way of example, e. g., each individual element can be driven separately. Further the partitions between the individual sections need not be formed exactly conically. The reactants can for example be directed by special flat or curved plates, insertions into the walls, tubes and the like. The speed of passage of the reactants through the reaction chamber may be controlled by the degree of pressure maintained in the tubes 2 and 5 or by the degree of vacuum in the tubes 14 and 15.

The walls of the individual sections or the elements arranged in these may have a form which varies from one to the other. If more than two materials take part in the reaction, which the object of leading them to the reaction vessel further tubes may be connected at suitable places.

Individual sections or all the sections may be provided with suitably formed cooling or heating apparatus.

As further suitable applications of the apparatus the following may be mentioned by way of example: washing and purification of gases, saturation of fluids with gases, purification of liquids, formation of precipitates, etc.

What I claim is:

Apparatus for carrying out physical and/or chemical reactions between a liquid or suspension, and a gas, comprising a column divided into superposed sections by partitions raised in the middle into a cone, means for feeding the reactants in countercurrent through said column, a mixing device in each section located below the liquid surface and acting to produce a dispersion of the gaseous reactant in the liquid, said dispersion substantially filling the section, separate inlets for the liquid and the gaseous reactant in each section, located below the liquid surface near the mixing device, the gas inlet being provided on the upper part of the conical partition below the mixing device, separate outlets for each of the changed reactants or products of reaction at points remote from the mixing device, the outlet for the liquid being provided near the base of each partition, finally separate means for removing the changed reactants or products of reaction from the column.

GEORGE DE BECZE.